July 8, 1930.  W. O. DAVIS  1,770,300
OIL GAUGE WIPER
Filed April 22, 1929
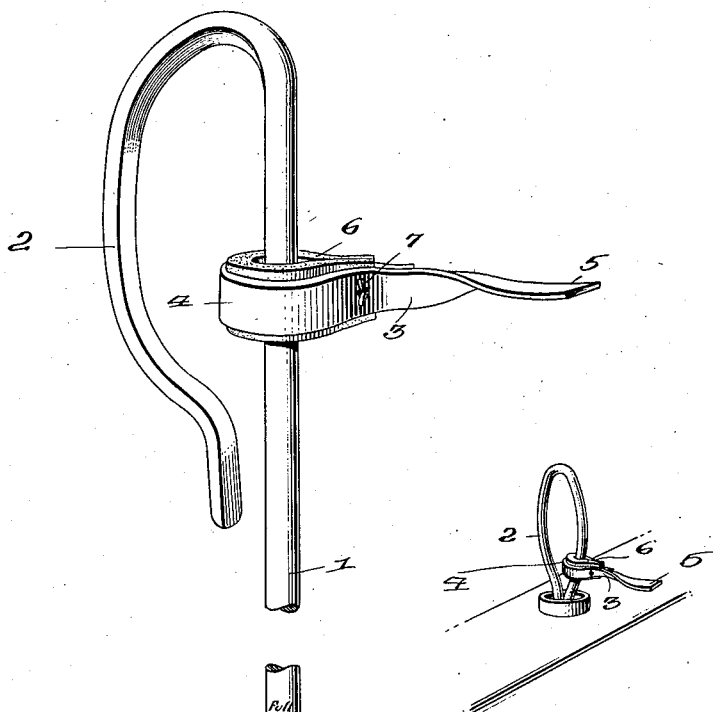
Inventor
William O. Davis
By Vernon E. Hodges
his Attorney Patented July 8, 1930

1,770,300

UNITED STATES PATENT OFFICE

WILLIAM OLAN DAVIS, OF HUNTINGTON, WEST VIRGINIA, ASSIGNOR OF ONE-HALF TO JAMES A. DOBYNS, OF PROCTORVILLE, OHIO

OIL-GAUGE WIPER

Application filed April 22, 1929. Serial No. 357,153.

This invention relates to an improvement in oil gauge wipers.

The present invention relates to a device that is adapted to thoroughly and easily wipe the oil from an ullage rod so that measurement of the oil in the reservoir may be made.

The object of the invention is to provide an inexpensive device that may be applied to any ullage rod, always being in a convenient location, and capable of giving efficient service.

With the above and other objects in view, the invention consists in the details of construction and the arrangement and combination of parts to be hereinafter more fully set forth and claimed.

In the accompanying drawings:

Fig. 1 is a perspective view of the ullage rod and wiper, and

Fig. 2 is a view showing the handle of the ullage rod and the wiper while the rod is inserted into the oil sump of the engine.

In the drawings, 1 is the measuring rod and 2 is the handle thereof. The wiper 3 is made of a strip of metal which is bent into a loop 4 at one end and twisted at ninety-degrees at the other end to form the handle thereof 5.

The metal strip 3 is bent around the rod 1, holding between it and the rod a piece of felt or other material 6 which is held tightly in contact with the rod by a cotter pin, or other convenient fastening device 7.

When the ullage rod is withdrawn from the oil sump, it is generally covered with oil from the splashing within the crank-case. By merely sliding the wiper 3 down to the end of the rod the oil will be removed so that an accurate measurement may be made by again inserting the rod into the oil sump.

The handle 2 of the rod is made of spring material so that when the rod is withdrawn from the oil sump it will expand, as shown in Fig. 1, and allow the wiper 3 to slide along the rod 1. When the rod is in place in the oil sump, the spring will hold it securely in place, as shown in Fig. 2.

By repeated use of the wiper to remove the oil from the rod, the felt 6 will become loose and will lose its efficiency. By tightening the fastener 7 the loop 4 is made smaller and the felt 6 is again brought into tight frictional contact with the rod.

Fig. 2 is to show the position of the wiper when the measuring rod is inserted into the oil sump, its normal position.

Having thus described my invention, what I claim and desire protection by Letters Patent is:—

1. An ullage rod wiper comprising an elongated member having a handle at one end and a loop at the other end, and a wiping medium secured within the loop.

2. An ullage rod wiper comprising a strip of material bent to form a loop, a strip of soft wiping material covering the inside of said loop and adapted to receive a rod therethrough, and means adjustably connecting the end portions of the loop together to adjust the size of said loop.

3. An ullage rod wiper comprising a strip of material bent into a loop, a strip of soft wiping material secured to the inner side of said loop, and means connecting end portions of the loop together to adjust the size thereof, an extreme end portion of the first strip of material extending from the loop to form a handle.

4. An ullage rod wiper comprising a member having a portion thereof bent to form a loop to receive an ullage rod therein, a wiping medium secured within the loop, an extreme end portion of the first-mentioned member extending from the loop to form a supporting portion.

In testimony whereof I affix my signature.

WILLIAM OLAN DAVIS.